United States Patent [19]

Lian et al.

[11] Patent Number: 5,659,457

[45] Date of Patent: Aug. 19, 1997

[54] CARBON ELECTRODES AND ENERGY STORAGE DEVICE MADE THEREOF

[75] Inventors: Keryn Ke Lian, Northbrook; Changming Li; Lijun Bai, both of Vernon Hills; Marc K. Chason, Schaumburg, all of Ill.

[73] Assignee: Motorola, Inc., Schaumburg, Ill.

[21] Appl. No.: 418,353

[22] Filed: Apr. 7, 1995

[51] Int. Cl.[6] ............................................ H01G 9/00
[52] U.S. Cl. ........................... 361/502; 361/508; 361/528
[58] Field of Search .................................. 361/502, 508, 361/516, 528, 532; 429/209, 212, 218–219, 222–224, 229

[56] References Cited

U.S. PATENT DOCUMENTS 4,633,372  12/1986  Calahan et al. .
5,455,999  10/1995  Weiss et al. .................. 29/623.1
5,501,922   3/1996  Li et al. ......................... 429/218

FOREIGN PATENT DOCUMENTS 6244362  8/1993  Japan .

*Primary Examiner*—Bot L. Ledynh
*Attorney, Agent, or Firm*—Ken Massaroni; Dale Dorinski

[57] ABSTRACT

An electrode for an energy storage device uses a protonated polymer that is imbedded with an electroactive metal and coated onto activated carbon. Protonated poly(4-vinylpyridine) is coated onto particles of activated carbon that have high surface area, and the coating is then imbedded with a metal that exhibits electroactive behavior. In one embodiment, ruthenium is plated onto the poly(4-vinylpyridine) to create the electrode. Optionally, a coating of an ionically conductive negatively charged polymer is applied over the ruthenium-imbedded coating. The improved electrode is used to make a capacitor.

6 Claims, 5 Drawing Sheets

CARBON ELECTRODES AND ENERGY STORAGE DEVICE MADE THEREOF

CROSS REFERENCE TO RELATED APPLICATIONS

This application is related to application Ser. No. 08/418,354 by Li, et al., entitled "Polyoxometalate Carbon Electrodes and Energy Storage Device Made Thereof," filed concurrently herewith, and assigned to Motorola, Inc., now U.S. Pat. No. 5,501,922.

TECHNICAL FIELD

This invention relates in general to electrical energy storage devices and more particularly to double layer capacitors and electrodes for use with double layer capacitors.

BACKGROUND

Energy generation and storage has long been a subject of study and development. Of special import is the storage of energy in a compact form that can be easily charged and discharged, such as rechargeable batteries and/or capacitors. The components of these various systems have been generally optimized by seeking to achieve the maximum stored energy density. However, most, if not all, commercially-available systems yield far less than their theoretical energy density. One such energy storage system utilizes activated carbon electrodes to store charge. One example of an activated carbon electrode system is a double layer capacitor system described in U.S. Pat. No. 3,536,963. The mechanism for energy storage is based on the formation of an electrical double layer at the interface between an activated carbon electrode and a supporting electrolyte under an applied electrical field. Double layer capacitors will accept and store significant amounts of energy at a wide variety of potentials, unlike batteries where a given threshold voltage must be exceeded. Optimization of this type of system is based upon enhancing the charge storage capacity of the activated carbon electrode. Double layer capacitors can exhibit a capacity equivalent to tens of farads per gram of activated carbon when the activated carbon has a surface area in excess of 1000 square meters per gram ($m^2/g$). However, this system has limited application because the energy density needs to be even greater, and efforts have been made to coat metal or metal oxides on the carbon surface to increase the energy density and conductivity of the electrode. Coating electrochemically active metals on carbon combines the advantages of the metal's good conductivity and electrochemical activity with carbon's high surface area. Those familiar with catalysis will appreciate that carbon is often used as a support structure upon which metal is coated directly to form a catalyst. Techniques such as electroplating and vacuum deposition (e.g. sputtering, evaporation, etc.) have been used to coat the particles. However, electroplating metal on carbon is very difficult due to the porous structure of the carbon, which causes a non-uniform current distribution and results in a relatively poor metal-carbon bond. The use of metals and polymers mixed with activated carbon was demonstrated in a 1983 patent by the Lucas Research Centre, England (UK Patent 2054252B). This patent discloses a pressed plate secondary zinc electrode containing 16 to 50% graphite, 0.5 to 10% polytetrafluoroethylene (PTFE) and small amounts of heavy metal oxides (e.g. HgO, PbO, and CdO). The optimum mixture was found to be 32% graphite, 5% PTFE, 62% ZnO and 1% metallic oxides. However, these electrodes were simply physical mixtures of the various ingredients, and they too suffered from the inability to utilize all of the available surface area of the carbon.

Clearly, it would be desirable to form an electrode that exhibits increased charge storage capacity, thus further enabling the miniaturization of energy storage devices.

DETAILED DESCRIPTION OF THE PREFERRED EMBODIMENT

Figure 1:
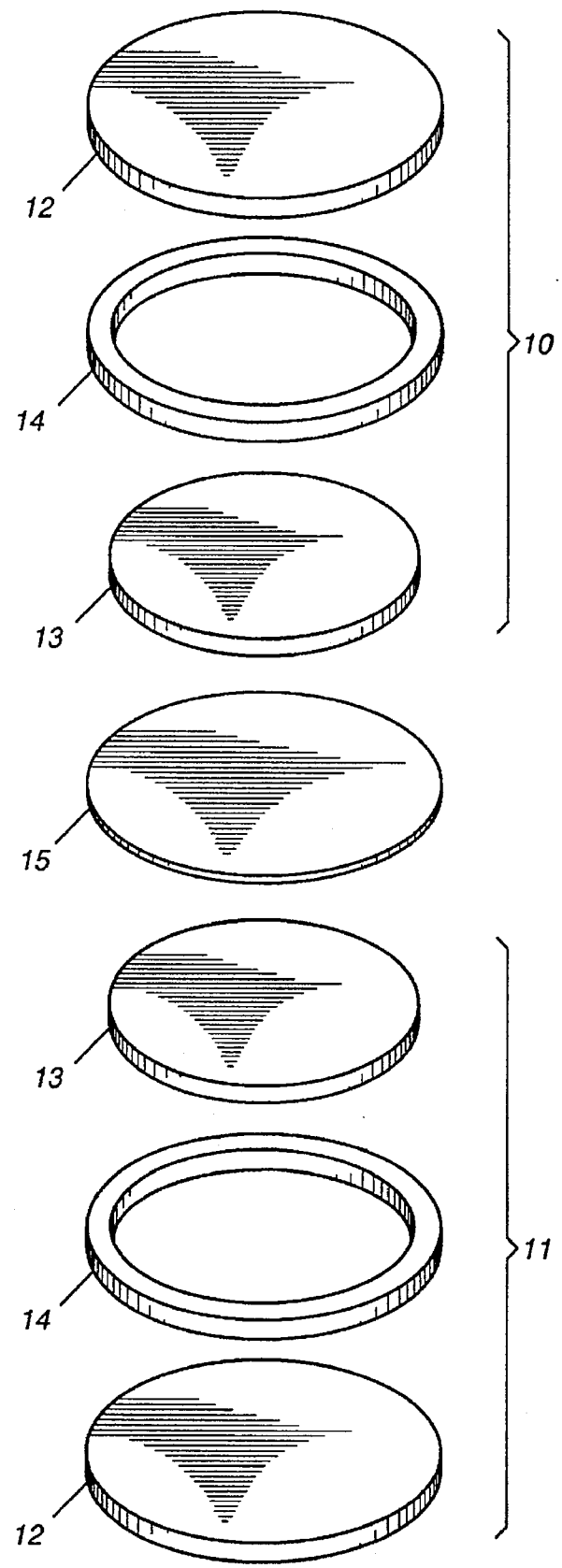
FIG. 1 is an exploded view of the components of a typical energy storage device.

The current invention utilizes charged polymers as intermediates to "bridge" the metal-carbon interface, so that an electrochemically active material can be plated on the carbon to take full advantage of the large surface area of activated carbon. While the specification concludes with claims defining the features of the invention that are regarded as novel, it is believed that the invention will be better understood from a consideration of the following description in conjunction with the drawing figures, in which like reference numerals are carried forward.

Referring now to FIG. 1, an energy storage device, such as a double layer capacitor, is typically made from a pair of identical electrode assemblies 10 and 11. Each electrode assembly includes a current collector 12 which is electrically conducting and ionically insulating. Current collector 12 may be made of any conventional material such as nickel, titanium, stainless steel, or iron, and may be in sheet form, a mesh or a screen. The current collector 12 is preferably chemically inert to the particular electrolyte employed. A housing or gasket 14 is connected to the current collector 12 and the carbon electrode 13 is contained within the housing. A separator 15 is affixed between the two electrodes 10 and 11 and functions as an electrical insulator between the electrodes, and it affords free and unobstructed movement to the ions in the electrolyte. Of course, the separator 15 must also prevent contact between the opposing carbon electrodes 13, since such a condition would result in a short circuit and malfunction of the capacitor. Materials useful for the separator 15 are well known to those skilled in the art, including porous polyvinylchloride, filter paper, polypropylene, cellulose acetate, felt, and other types of similar materials. The separator 15 is typically saturated with the electrolyte when aqueous or other liquid electrolytes are used. Electrolytes used with this invention should consist of highly-conductive media, such as aqueous solutions of an acid, salt, or a base. Examples of some suitable aqueous electrolytes are ammonium chloride, sodium chloride, calcium chloride, potassium chloride, sulfuric acid, sodium hydroxide, potassium hydroxide, hydrochloric acid, etc.

The carbon electrode 13 consists of activated carbon having a protonically conducting polymer absorbed into the carbon. The activated carbon or graphite is available in many forms, for example, particles, fibers, powder, sheet, cloth, felt, etc. and all may find use in forming an electrode. In the preferred embodiment, activated carbon powder was coated with a conductive polymer to form the electrode. Examples of some suitable conducting polymers include, but are not limited to, the electrically conductive members of the polyether, polyamide, poly(acrylic acid), and polyamine families. More specifically, poly(ethylene oxide), polyvinylalcohol, poly(acrylamide), poly(vinylpyrrolidone), poly(2-vinylpyridine), poly(4-vinylpyridine), and poly(ethyleneimine) may be employed as conducting polymers. In the preferred embodiment, protonated poly(4-vinylpyridine) (HPVP$^+$) is used as the conducting polymer. The HPVP$^+$ serves two purposes: a) increasing the capability of trapping metal complexions via electrostatic interaction; and b) increasing the charge capacity by combining both the responses from polymer and multi-layer trapped metals. The protonically conducting polymer has one or more electroactive metals such as Ag, Bi, Cd, Co, Cr, Ir, Mn, Mo, Ni, Pd, Pt, Ru, Sb, Sn, or Zn absorbed within the matrix of the polymer. In the preferred embodiment, ruthenium is used. The electroactive metals should have multiple valence states, for example, the transition metals. Thus, the activated carbon has the conductive polymer adsorbed on the surface, with the ruthenium imbedded or impregnated into the polymer matrix. The polymer acts as a "bridge" or intermediate to aid in bonding the metal to the carbon, and also to ensure that the metal is optimally coated onto the surface of the carbon, thereby effectively utilizing the large surface area of the carbon particles. The pH of the electrolyte should be chosen so that the metal system is stable, and may vary depending upon the particular metal selected. Since polymer films generally contain the equivalent of many monomolecular layers worth of electroactive sites, the electrochemical response of the impregnated polymer film can be much larger than that of immobilized monomolecular layers such as described in U.S. Pat. No. 4,633,372, incorporated herein by reference. The instant invention increases the charge storage capacity of the activated carbon by implanting one or more metals into the conductive polymer-coated activated carbon surface. In the prior art, attempts to deposit the metal coating directly on the activated carbon surface met with limited success, because the metal does not uniformly deposit on the entire usable surface of the activated carbon, thereby creating localized areas of high current density. Also, in the prior art, the metal is only physically absorbed on the carbon surface and can be easily leached out during cycling of the electrode. By first coating the surface of the carbon with the HPVP, a structure is formed that has a static charge that provides an improved linkage for the metal/ carbon bonding. In fact, the metal is not deposited on top of the HPVP film, but is believed to be imbedded within the polymer matrix and ionically attached to the polymer. In this way, the metal finds a much more uniform distribution over the carbon particles, creating an electrode with higher capacity and longer cycle life.

An ionically conductive negatively charged polymer is coated over the metal-impregnated HPVP. Although several polymers of this type are well known (phenol sulfonic, polystytrene sulfonic, poly(trifluorostyrene sulfonic) and perflourinated sulfonic), one polymer that finds particular application is a perfluorosulfonic acid polymer known as NAFION®, available from the DuPont Company of Wilmington, Del. NAFION® has the chemical structure:

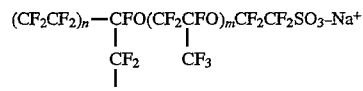

The NAFION® series of solid polymer electrolytes (SPE) may be regarded as sulfonated analogs of Teflon, even though they contain ether linkages. On the molecular level, the polymer has a tubular structure, in which the —$SO_3$= groups are on the inner surface of the tubes, which provides hydrophilic conduits for conduction, the outer parts of the tubes being hydrophobic fluorinated material. The tubular structures shrink and rearrange as the water content decreases. The purpose of the NAFION® coating is to reduce the rate of leaching of the electroactive metal into the electrolyte, thereby increasing the cycle life of the electrode. The NAFION® coating is optional, and not necessary.

The following examples will serve to illustrate the increased charge storage capacity of the activated carbon electrode that has been achieved by the instant invention.

Preparation of Solutions

An HPVP$^+$ solution was prepared by placing a measured quantity of poly(4-vinylpyridine) (PVP) with a molecular weight of about 50,000 (obtained from Aldrich Chemical Company) into a beaker containing a magnetic stirring bar. Half of the water required to make a 2% solution by weight of PVP was added to the beaker, and concentrated hydrochloric acid (HCl) was added dropwise to completely protonate the PVP, forming HPVP$^+$. (Concentrated $H_3PO_4$ or $H_2SO_4$ could also have been used). The rate at which the HCl was added was such that equilibrium was achieved between each successive addition of acid. After complete dissolution of the polymer, the final pH of the solution was adjusted to about 3, then additional make-up water was added in order to bring the final concentration of HPVP$^+$ to about 2% by weight.

The metal plating solution was ruthenium, prepared by making a 0.05M ammonium hexachlororuthenatel (Aldrich Chemical) and 0.05M hexaammineruthenium chloride solution (Aldrich Chemical). The solution could be used repeatedly with replenishment of the electroplated species.

Preparation of Electrodes

EXAMPLE 1

A control microelectrode was made from activated carbon powder having a surface area of approximately 2000 square meters per gram (m$^2$/g). The carbon powder used was grade M-20 obtained from Spectro Corp. The dry powder was firmly packed into a cavity formed in the end of a platinum wire electrode.

EXAMPLE 2

Another microelectrode was created by electroplating ruthenium directly onto the carbon surface using a constant current (galvanostatic) method. A small current is used to control the electrode potential within −0.95 to −1.05 V (versus Ag/AgCl). In general, the electroplating current density was about 2 to 5 mA/cm$^2$ and the plating time was between 3600 to 5000 seconds. After plating, the microelectrode was rinsed with water and dried in an oven at 70° C.

EXAMPLE 3

Another microelectrode was created by immersing an electrode similar to that of Example 1 in the 2% HPVP$^+$ solution for 30 min and drying at 80° C. for 1 to 2 hours. Ruthenium was impregnated into the deposited HPVP+ coating by using a constant current (galvanostatic) method. A small current is used to control the electrode potential within −0.95 to −1.05 V (versus Ag/AgCl). The electroplating current density was about 2 to 5 mA/cm$^2$ and the plating time was between 3600 to 5000 seconds. After plating, the microelectrode was rinsed with water and dried in an oven at 70° C.

Figure 2:
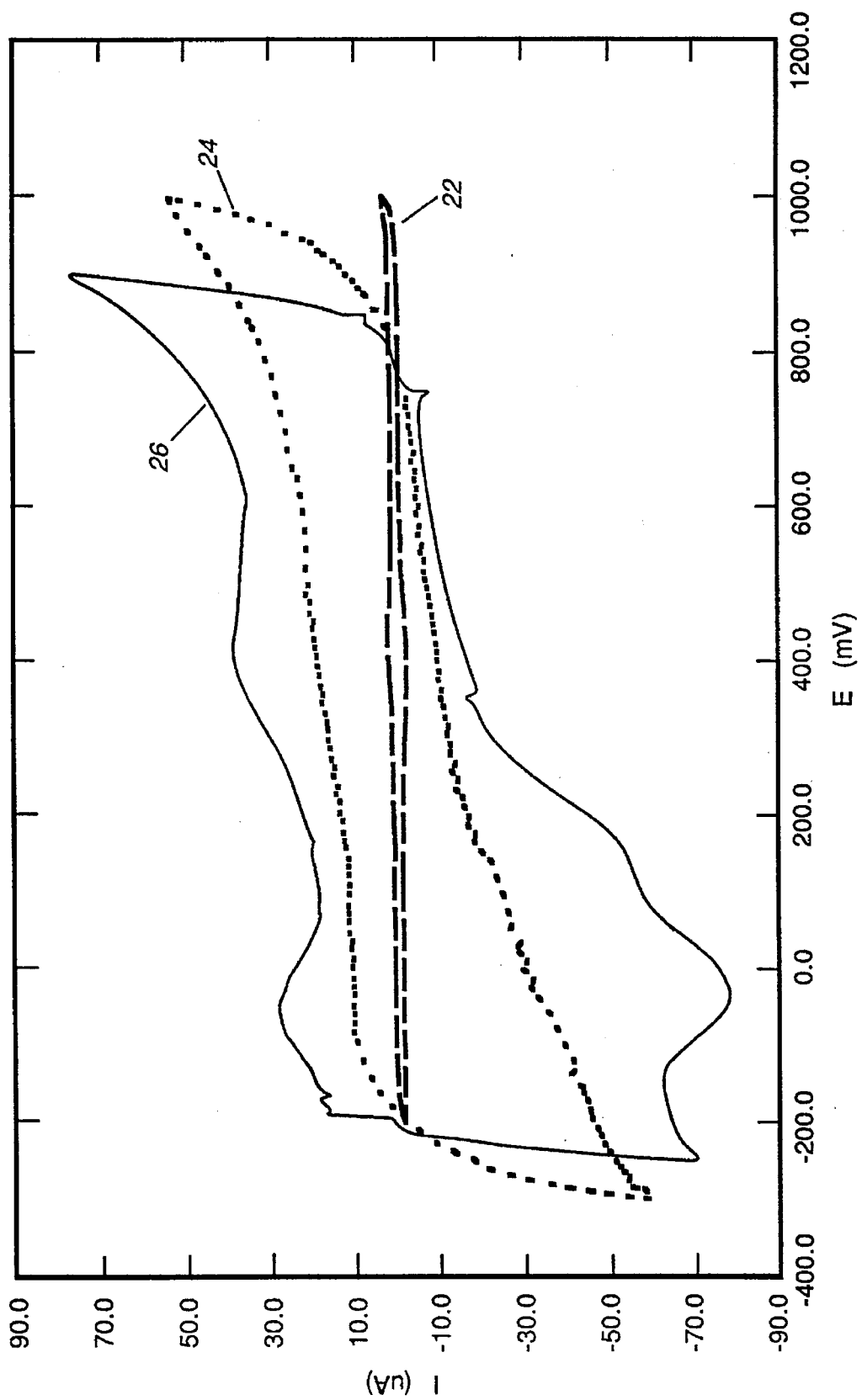
FIG. 2 is a cyclic voltammogram of carbon powder microelectrodes using 1M $H_2SO_4$.

FIG. 2 shows a comparison of electrochemical behaviors in terms of cyclic voltammetric (CV) response using a 1M $H_2SO_4$ electrolyte for the graphite microelectrode of Example 1 (22), the electrode of Example 2 having Ru coated on graphite (24), and the electrode of Example 3 having Ru/HPVP+ coated graphite (26). The addition of metal (24) to the electrode system improved the performance over a simple pure carbon (22) electrode, similar to that previously reported in the literature. However, the Ru/HPVP+ coated graphite (26) showed enhanced electrochemical activity compared with both the pure graphite electrode 22 and the metal plated electrode 24. The impregnation of HPVP+ introduced additional capacity which increased the charge density of the electrodes.

EXAMPLE 4

Still another microelectrode was created by immersing an electrode similar to that of Example 1 in the 2% HPVP+ solution for 30 min and drying at 80° C. for 1 to 2 hours. Ruthenium was impregnated into the deposited HPVP+ coating by using a constant current (galvanostatic) method. A small current is used to control the electrode potential within −0.95 to −1.05 V (versus Ag/AgCl). The electroplating current density was about 2 to 5 mA/cm$^2$ and the plating time was between 3600 to 5000 seconds. After plating, the microelectrode was rinsed with water and dried in an oven at 70° C. The dried electrode was then immersed in a solution of NAFION® for one to two seconds and left to air dry for 16 to 24 hours before being dried in an oven for 10 hours for final finishing. An electrolyte solution of 1M $H_2SO_4$ was used.

Figure 3:
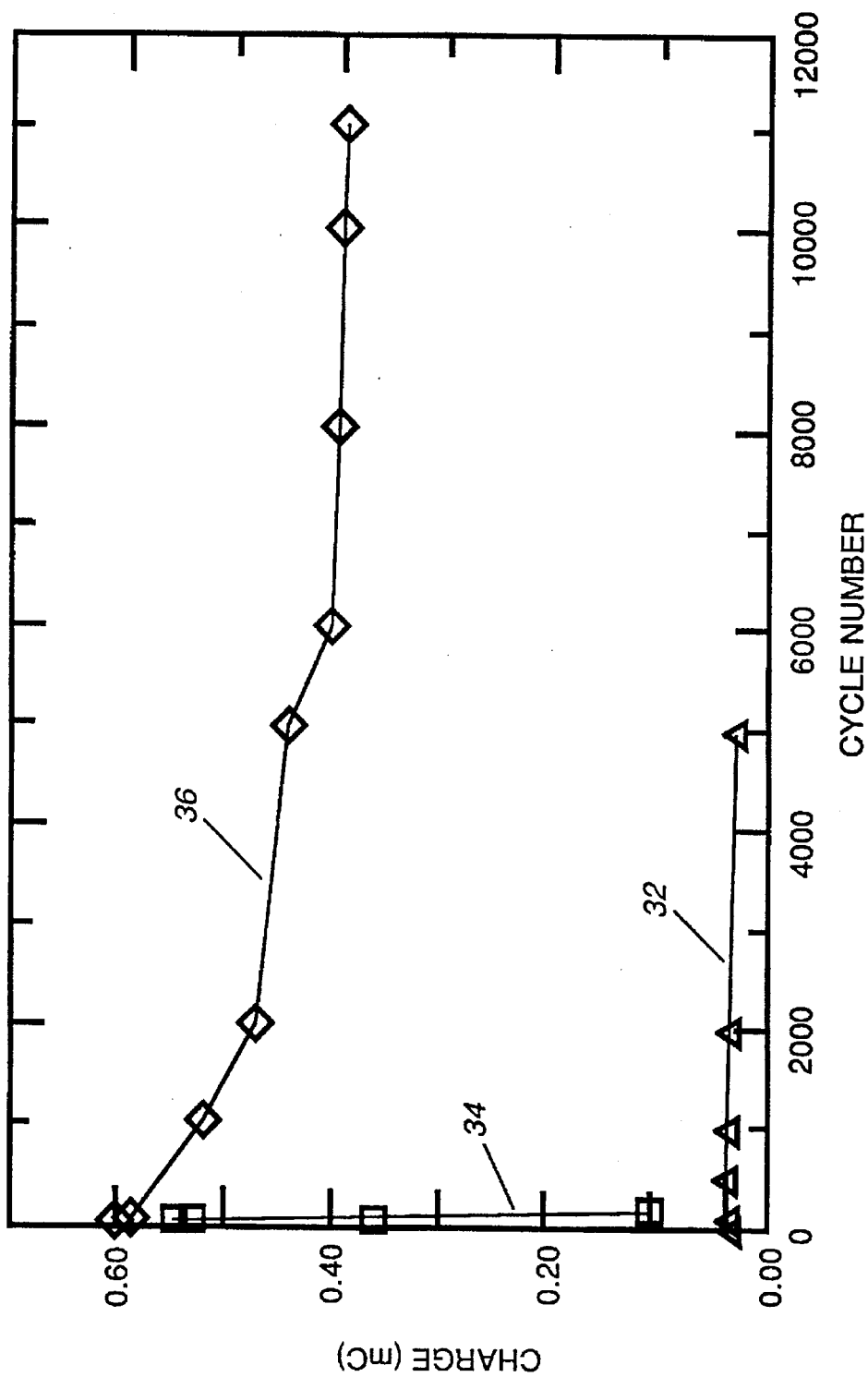
FIG. 3 is a graph of charge capability in microcouloumbs vs. charge/discharge cycles, illustrating the comparative cycle life of prior art electrodes and an electrode made in accordance with the invention.

FIG. 3 shows a graph of charge capability in microcoulombs vs. charge/discharge cycles, illustrating the comparative cycle life of prior art electrodes and an electrode made in accordance with the invention. The simple carbon electrode (32) of Example 1 exhibited good cycle life, but poor charge capability. The electrode with ruthenium plated on the carbon as in Example 2 (34) showed improved charge capability, as learned from FIG. 2, but very poor cycle life, degrading dramatically after only a few hundred cycles. It is believed that this is due to the poor bonding between Ru and the carbon material. However, the electrode of Example 4 having Ru/HPVP+ coated graphite and a thin layer of NAFION® (36) showed the best charge capability and superior cycle life. The thin layer of NAFION® is helpful to diminish the decrease of activity of the coated materials. The charge tends to reach a steady-state with a surface layer of NAFION®.

Figure 4:
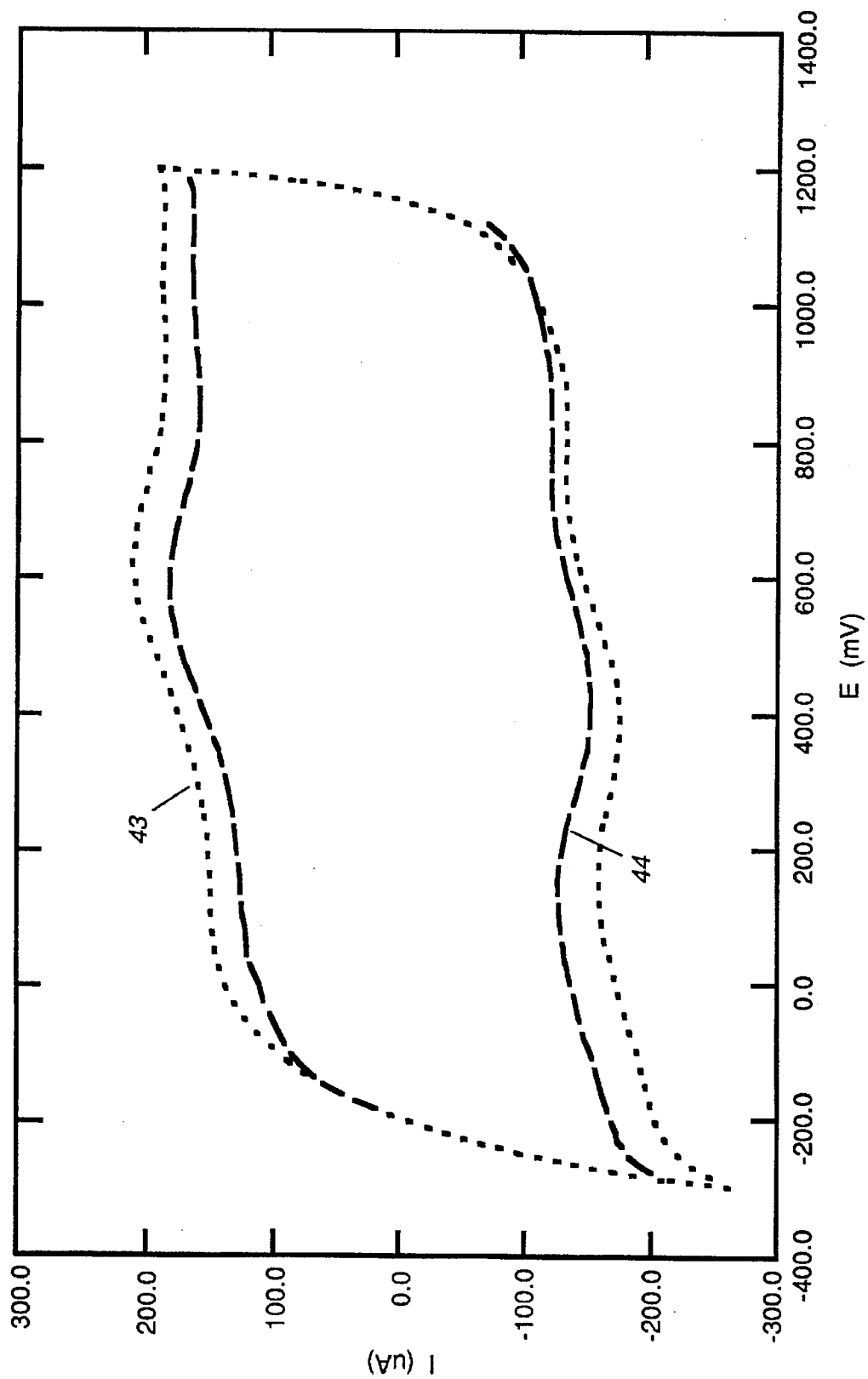
FIG. 4 is a cyclic voltammogram of a carbon powder microelectrode made in accordance with the invention, after 2000 charge/discharge cycles and after 10,000 charge/discharge cycles.

FIG. 4 shows CV profiles of the NAFION® coated electrode of Example 4 after 2000 charge/discharge cycles (43) and after 10,000 cycles (44). Even after many cycles, the electrode still exhibited excellent charge storage capability. In addition, the resistance of this cycled electrode remained relatively small, as evidenced by the fact that its potential could be cycled with relatively high sweep rates (>500 mV/s). This modified electrode withstood over 11,000 CV cycles with very little decrease in activity.

Figure 5:
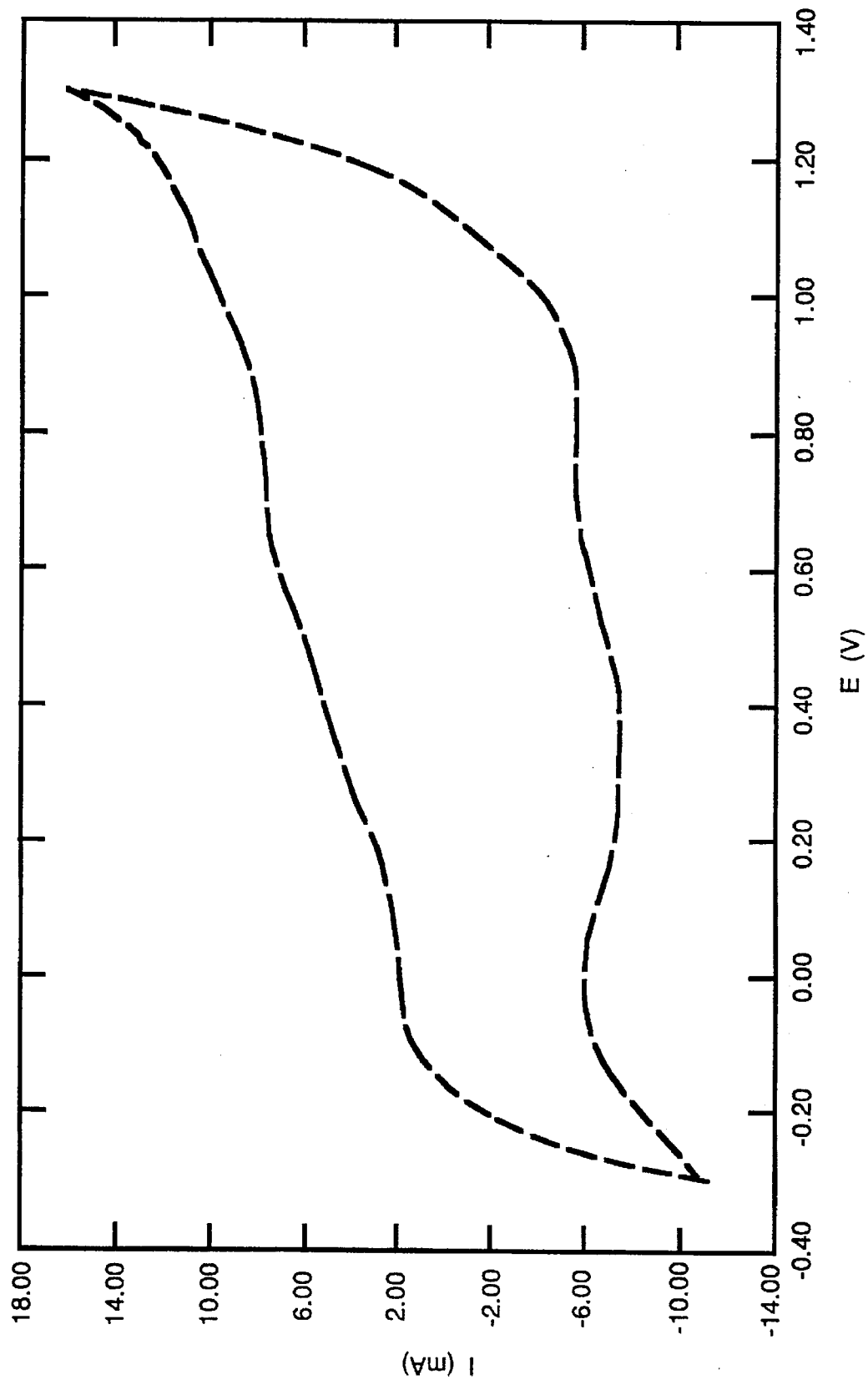
FIG. 5 is a cyclic voltammogram of a full scale electrode made in accordance with the invention.

As a further reduction to practice, larger free-standing electrodes were made and tested. A graphite sheet was used to fabricate the electrode, and it was coated with Ru/HPVP+/NAFION® in a manner similar to that described in Example 4. Referring now to FIG. 5, the CV profile indicated that the electrode had significant capacity (approximately 65 mC/cm$^2$) and exhibited a nearly mirror-image curve, indicating excellent capacitive behavior. The charge density can be further improved by increasing the electroplating time and surface area of the substrate.

As may now be appreciated, the electrode of the instant invention provides superior performance over those known in the prior art, and may be used to form an electrical energy storage device such as a capacitor, which exhibits significantly improved performance over previous capacitors. The ability to implant the electroactive species within the protonically conductive polymer matrix allows a greater usage of the available surface area of the carbon substrate. Vastly improved cycle life of the electrode and capacitor can also be realized by the invention. Activated carbon modified with protonated poly (4-vinylpyridine), ruthenium and NAFION® was found to create an improved electrode. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An energy storage device comprising a pair of electrodes and an electrolyte in contact with said pair of electrodes, at least one of said pair of electrodes comprising an activated carbon support having absorbed therein a protonated polymer film implanted with an electroactive material, said protonated polymer film further comprising a coating of an ionically conductive negatively charged polymer.

2. The energy storage device as described in claim 1, wherein the ionically conductive negatively charged polymer is a perfluorosulfonic acid polymer.

3. The energy storage device as described in claim 1, wherein the electroactive material is one or more metals selected from the group consisting of Ag, Bi, Cd, Co, Cr, Ir, Mn, Mo, Ni, Pd, Pt, Ru, Sb, Sn, and Zn.

4. The energy storage device as described in claim 1, wherein the protonated polymer is one or more materials selected from the group consisting of polyether, polyamide, poly(acrylic acid), and polyamine.

5. The energy storage device as described in claim 1, wherein the protonated polymer is one or more materials selected from the group consisting of poly(ethylene oxide), polyvinylalcohol, poly(acrylamide), poly(vinylpyrrolidone), poly(2-vinylpyridine), poly(4-vinylpyridine), and poly(ethyleneimine).

6. An energy storage device comprising an electrolyte in contact with a pair of electrodes, at least one of said pair of electrodes comprising an activated carbon support having absorbed therein protonated poly(4-vinylpyridine) implanted with ruthenium and having a coating of a perfluorosulfonic acid polymer overlying the implanted protonated poly(4-vinylpyridine).

* * * * *